United States Patent [19]
Gossett et al.

[11] Patent Number: 5,950,498
[45] Date of Patent: Sep. 14, 1999

[54] HANDLE STORAGE APPARATUS AND METHOD

[76] Inventors: J. Cary Gossett, 416 18th St., Santa Monica, Calif. 90402; Kenneth R. Sacks, 20458 Paradise La., Topanga, Calif. 90290

[21] Appl. No.: 08/908,730

[22] Filed: Aug. 7, 1997

[51] Int. Cl.$^6$ .................................................. B62K 21/12
[52] U.S. Cl. ...................... 74/551.8; 74/551.1; 224/420
[58] Field of Search ................ 74/551.8, 551.9, 74/551.3, 551.7, 588.5; 403/109.3, 110, 344, 367, 374, 378; 224/32 R, 30 A, 420, 435

[56] References Cited

U.S. PATENT DOCUMENTS

| | | | |
|---|---|---|---|
| 2,603,701 | 7/1952 | Shadel | 74/551.8 X |
| 3,918,323 | 11/1975 | Prager | 74/551.8 |
| 4,623,954 | 11/1986 | Schott | 74/551.9 X |
| 4,676,120 | 6/1987 | Borromeo | 74/551.1 |
| 4,856,364 | 8/1989 | Dixon | 74/551.8 |
| 4,875,142 | 10/1989 | Spector | 74/551.8 X |
| 5,253,920 | 10/1993 | Eldridge | 296/97.22 |
| 5,263,275 | 11/1993 | Rumbaugh | 74/551.9 X |
| 5,297,445 | 3/1994 | Chen | 74/551.3 |
| 5,355,746 | 10/1994 | Lin | 74/551.8 |
| 5,380,026 | 1/1995 | Robinson | 280/276 |
| 5,531,494 | 7/1996 | Singleton | 294/1.1 |
| 5,683,200 | 11/1997 | Levy | 403/109.1 X |

FOREIGN PATENT DOCUMENTS

| | | | |
|---|---|---|---|
| 586503 | 1/1925 | France | 74/551.9 |
| NR 118586 | of 1927 | Germany | 74/551.9 |
| 8800828 | of 1989 | Netherlands | 74/551.9 |
| 15462 | of 1893 | United Kingdom | 74/551.8 |
| 11538 | of 1895 | United Kingdom | 74/551.8 |

OTHER PUBLICATIONS

Velcro International LTD., Velcro Product News—PN No. 34, Jun. 1977.
Colorado Cyclist, pp. 2, 39, 40, 41 and 42, Mid–Summer 1997 (1997).
Frankford Bicycle, pp. 2, 3, 4, 11 and 12, Spring 1997 (1997).
Moutain Mirrycle, 1 page (1991).

*Primary Examiner*—Rodney H. Bonck
*Assistant Examiner*—Ha Ho
*Attorney, Agent, or Firm*—T. Lester Wallace

[57] ABSTRACT

A storage apparatus facilitates the storage of items inside a handle (for example, a handle portion of a bicycle handlebar). The storage apparatus includes a cylindrical storage member coupled to an engaging device for removably engaging the handlebar. An item to be stored (for example, a tire lever) is placed in the cylindrical storage member, the cylindrical storage member is slid into the hollow open end of a handle bar until the engaging device plugs the end of the handlebar. The engaging device is then made to engage the handlebar (for example, by expanding circumferentially to frictionally engage the inside surface of the handlebar) to secure the storage member in place inside the handlebar. The item is retrieved by disengaging the engaging device from the handlebar, sliding the storage member out of the handlebar, opening the storage member, and removing the item.

21 Claims, 5 Drawing Sheets

HANDLE STORAGE APPARATUS AND METHOD

FIELD OF THE INVENTION

This invention relates to a storage apparatus to fit inside a handle or open-ended tube.

BACKGROUND INFORMATION

Bicycles often get flat tires, making the availability of tire patch kits and tire levers essential to complete the ride. Storage devices for bicycle repair tools are conventionally carried on the bicyclist or attached to the outside of the bicycle. Many bicyclists portage their repair tools in some variation of a backpack, bag, or purse. These storage devices are cumbersome and require vigilance to prevent loss or theft. Other riders carry repair tools in their clothes pockets, which can prove uncomfortable while riding. Racers often use jerseys with special pockets for their gear, but these jerseys are expensive. Moreover, for the bicyclist who carries tools on his/her person, packing the necessary tools is a preparation often forgotten.

These problems have been partially solved by storage devices that attach to the outside of the bicycle. Baskets, panniers, fender packs, bike racks, and handlebar bags have lessened the burden of carrying tools on one's body, yet they often require special mounting equipment and installation.

SUMMARY

A storage apparatus facilitates the storage of items inside a handle (for example, a handle portion of a bicycle handlebar). The storage apparatus includes a cylindrical storage member coupled to a means for removably engaging the handlebar. An item to be stored is placed in the cylindrical storage member, the cylindrical storage member is slid into the hollow open end of a handlebar until the means plugs the end of the handlebar. The means is then made to engage the handlebar (for example, by expanding circumferentially to frictionally engage the inside surface of the handlebar) to secure the storage member in place inside the handlebar. The item is retrieved by disengaging the means from the handlebar, sliding the storage member out of the handlebar, opening the storage member, and removing the item.

This summary does not purport to define the invention. The invention is defined by the claims.

DETAILED DESCRIPTION OF THE PREFERRED EMBODIMENTS

Figure 1:
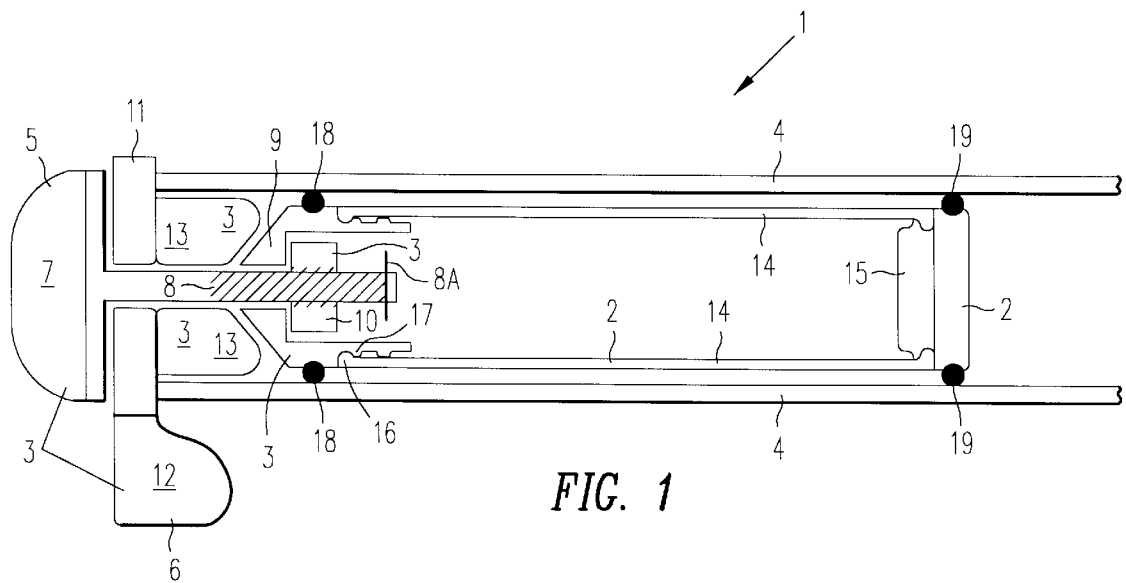
FIGS. 1 and 2 are cross-sectional diagrams in accordance with a first embodiment.

FIG. 1 is a cross-sectional diagram of a storage apparatus 1 in accordance with one embodiment. The storage apparatus 1 includes a substantially cylindrical storage member 2 and a means for removably engaging a handle portion (as opposed to the stem of the handlebar) of a handlebar 4. The means for removably engaging 3 as illustrated is not engaging the inside surface of the handlebar. The means for removably engaging 3 includes a first portion 5 and a second portion 6, the first portion being rotatable with respect to the second portion. The first portion 5 has a finger grip portion 7, a threaded shaft portion 8, a wedge cap portion 9, and a nut 10. The second portion 6 includes a disk-shaped bar end cap 11 having a finger grip portion 12, and an expandable washer 13. The expandable washer may be glued to the bar end cap 11. The substantially cylindrical storage member 2 includes a tubular member 14 and an end cap 15.

Figure 2:
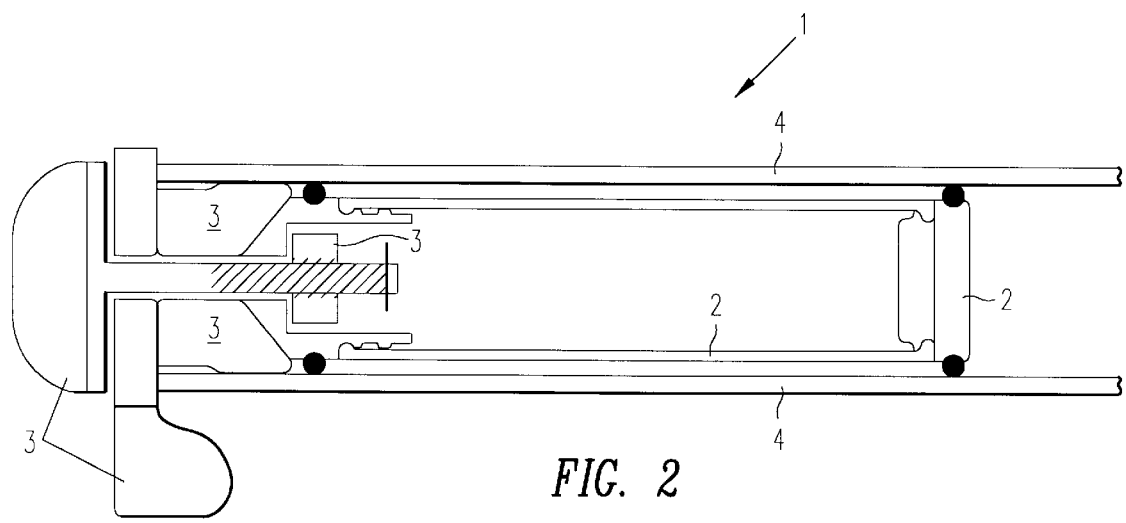
Figure 3:
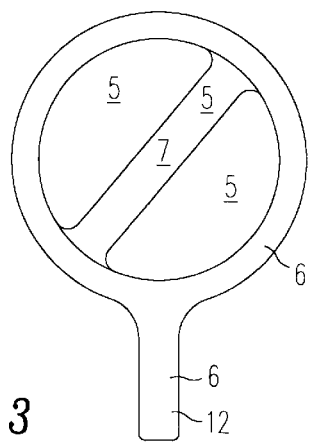
FIG. 3 is an end view of the embodiment of FIG. 1.

FIG. 1 is a cross-sectional diagram of the storage apparatus 1 wherein the means for engaging does not engage the handlebar (the storage member 2 can be removed from the handlebar). FIG. 2 is a cross-sectional diagram of the storage apparatus 1 wherein the means for engaging engages the handlebar such that the storage member 2 is secured inside the handlebar. FIG. 3 is an end view of the storage apparatus 1.

To use the storage apparatus 1, the storage apparatus 1 is removed from the handlebar 4 and the storage member 2 opened. In one embodiment, the end of the tubular member 14 has an inside annular rim 16 for engaging a corresponding annular retention ridge 17 on wedge cap 9. The tubular member 14 can be snapped onto the wedge cap 9 and decoupled from wedge cap 9. In this case, the tubular member 14 is decoupled from the wedge cap 9 to expose the open end of the storage member 2. An item to be carried on the cycle (for example, a tire lever) is then inserted into the storage member and the open end of the tubular member 14 is snapped onto the wedge cap 9. In this embodiment, the storage member is greater than three inches in length and is approximately 0.75 inches in diameter. The substantially cylindrical storage member 2 is then inserted into the hollow open end of the handlebar until the bar end cap 11 abuts and plugs the end of the handlebar 4.

With the storage member 2 disposed inside the handlebar, the first portion 5 is rotated clockwise with respect to the second portion 6 by use of the finger grip portions such that the threads of the threaded shaft portion 8 slidably engage the threads of nut 10 such that the wedge cap 9 is forced into the expandable washer 13. An hexagonal seat may be provided in wedge cap 9 to accommodate hexagonal nut 10 to prevent nut 10 from rotating with respect to the wedge cap. Forcing the wedge cap 9 into the expandable washer 13 causes the expandable washer 13 to expand circumferentially such that the expandable washer 13 frictionally engages the inside surface of handlebar 4 (as illustrated in FIG. 2) to secure the storage member 2 inside handlebar 4. The expandable washer also provides a water and dust seal.

In some embodiments, cushioning is provided to damp and/or prevent rattling of the storage member 2 against the inside surface of the handlebar 4. Rubber O-rings 18 and 19 are provided in one embodiment. To prevent nut 10 from coming off threaded shaft 8 once the means for engaging 3 is assembled, a C-clip or E-clip 8A is clipped onto the end of the threaded shaft 8. The C-clip or E-clip 8A may, for example, be engaged in an accommodating annular retaining groove in the end of the threaded shaft 8.

To retrieve the item (the tire lever in this example) stored in the storage member 2, the first portion 5 is rotated with respect to the second portion 6 in the opposite direction that it was rotated to secure the storage apparatus to the handlebar 9 (for example, counterclockwise). The wedge cap 9 is therefore retracted in the axial dimension from the expandable washer 13 such that the expandable washer 13 is no longer pressed against the inside surface of the handlebar. The expandable washer 13 contracts circumferentially and the means for engaging 3 no longer engages the inside surface of the handlebar. With the expandable washer contracted, the storage member 2 is slid out of the handlebar in the axial dimension. In this embodiment, the storage member 2 is opened to reveal the items stored by unsnapping the tubular member 14 from the wedge cap 9. End cap 15 can also be removed to reveal stored items.

In some embodiments, all or a portion of the storage member 2 is made of a clear material to allow visualization of its contents without necessitating removal of wedge cap 9 or end cap 15. Tubular member 14 can, for example, be made of clear plastic. C-clip 8A is removable, making the means for engaging rebuildable for replacing damaged or worn parts. The diameter, size and orientation of the finger grip portions 7 and 12 are chosen to facilitate manual grasping. The diameter and surface area of finger grip portion 7 and the material of the expandable washer 13 are chosen so that the storage member can be secured inside the handlebar easily with bare hands. Each finger grip portion has a substantially planar gripping surface having a surface area of at least 0.5 square inches. A set of C-rings with different outer diameters are provided with the storage apparatus so that the user can fit the storage member 2 to handlebars having different internal diameters. Alternatively, different numbers of wraps of tape can be wrapped around the storage member 2 to accommodate handlebars of different internal diameters.

It is to be understood that the invention is not limited to the particular structure for removably engaging the handlebar shown in FIG. 1. Numerous structures can be employed.

Figure 4:
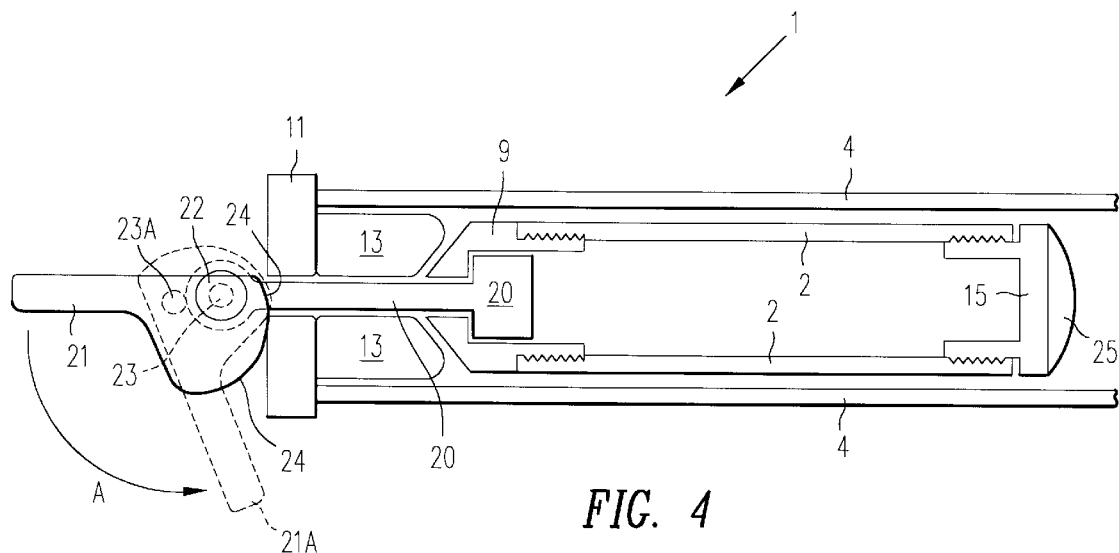
FIG. 4 is a cross-sectional diagram in accordance with a second embodiment.
Figure 5:
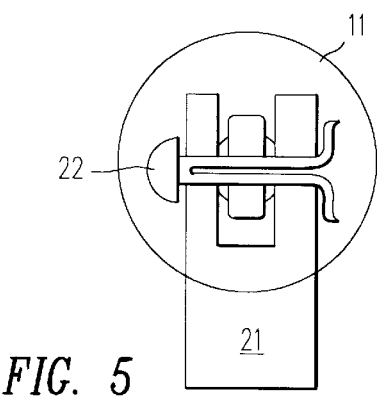
FIG. 5 is an end view of the embodiment of FIG. 4.

FIG. 4 is a cross-sectional diagram of another embodiment of storage apparatus 1. In this embodiment, the means for removably engaging includes a wedge cap 9, a pull rod portion 20, a lever portion 21, and a pin 22. Pin 22 in this embodiment is a metal pin with an end which can be deformed to secure the pin in place in the hole 23 in the lever portion 21. Bar end cap 11 does not have a finger grip portion 12 as in the embodiment of FIG. 1. FIG. 5 is an end view of the storage apparatus 1.

To press expandable washer 13 against the inside surface of the handlebar 4, lever portion 21 is moved in the direction of arrow A. Due to the off-center positioning of the hole 23 in lever 21 with respect to the rounded sliding surface 24 of lever 21, the lever 21 pivots so that pull rod 20 is pulled outwardly in the direction of bar end cap 11. Wedge cap 9 is therefore forced into expandable washer 13 and the expandable washer 13 is deformed to expand circumferentially such that the expandable washer 13 is pressed against the inside surface of the handlebar 4. The final position 21A of lever 21 when the expandable washer 13 is pressed against the inside surface of handlebar 4 is illustrated in dashed lines in FIG. 4. The position 23A of the hole in the lever 21 is farther away from the bar end cap 11 than when the lever is in the initial position.

The storage member 2 in this embodiment has a tubular member 2 with threaded ends. A first threaded end of the tubular member 2 threads onto a threaded end of wedge cap 9 whereas a second threaded end of the tubular member 2 threads onto a threaded end of end cap 15. End cap 15 has an extending finger grip portion 25 to facilitate unscrewing of the end cap 15 from the tubular member 2. End cap 15 can be turned to engage tubular member 2 without a finger grip portion 25.

Figure 6:
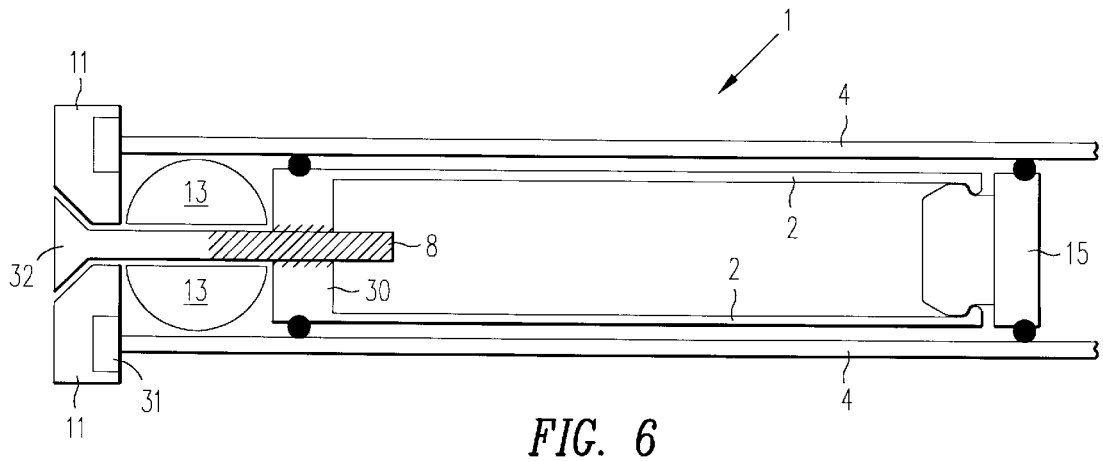
FIGS. 6 and 7 are cross-sectional diagrams in accordance with a third and fourth embodiment, respectively.

FIG. 6 is a cross-sectional view of another embodiment of the storage apparatus 1 wherein the expandable washer 13 has a ball-shape. There is no wedge cap. Rather, tubular member 2 has an integrally formed end 30 with a threaded hole. The threaded shaft 8 of a bolt 32 with a conical end (in this example, an ordinary Phillips headed bolt) threads into the threads of the threaded hole of the tubular member 2. The bar end cap has a contact washer 31 glued in an annular groove. This contact washer 31 is made of a soft flexible material such as rubber, PTFE or DELRIN to reduce vibration of the end cap against the end of the handlebar. The contact washer 31 also decreases friction, thereby allowing easier engagement. It can also be made of cork, leather, wood, nylon, polyethylene, polypropylene, vinyl, various impregnated or laminated fibrous materials, various plasticized materials, cardboard, paper and other such materials. In some embodiments, contact washer 31 has a conical-shape.

Figure 7:
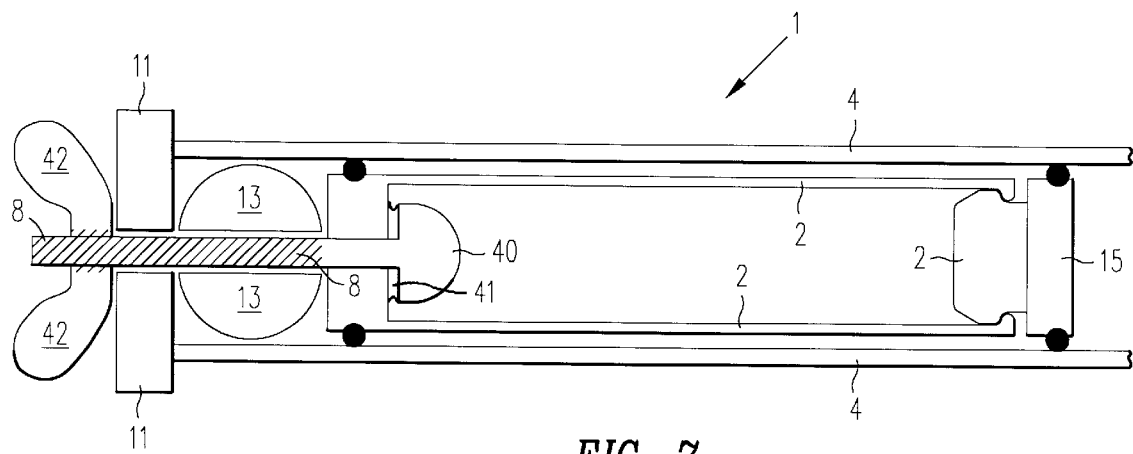

FIG. 7 is a cross-sectional view of another embodiment of storage apparatus 1. A bolt 40 is fixed (for example with glue 41) to the storage member 2 such that threaded shaft 8 extends in the axial dimension through expandable washer 13, through a hole in the bar end cap 11, and through a threaded hole in a wing nut 42. The expandable washer is circumferentially expanded by tightening wing nut 42 down on shaft 8 and is circumferentially contracted by loosening wing nut 42.

Figure 8:
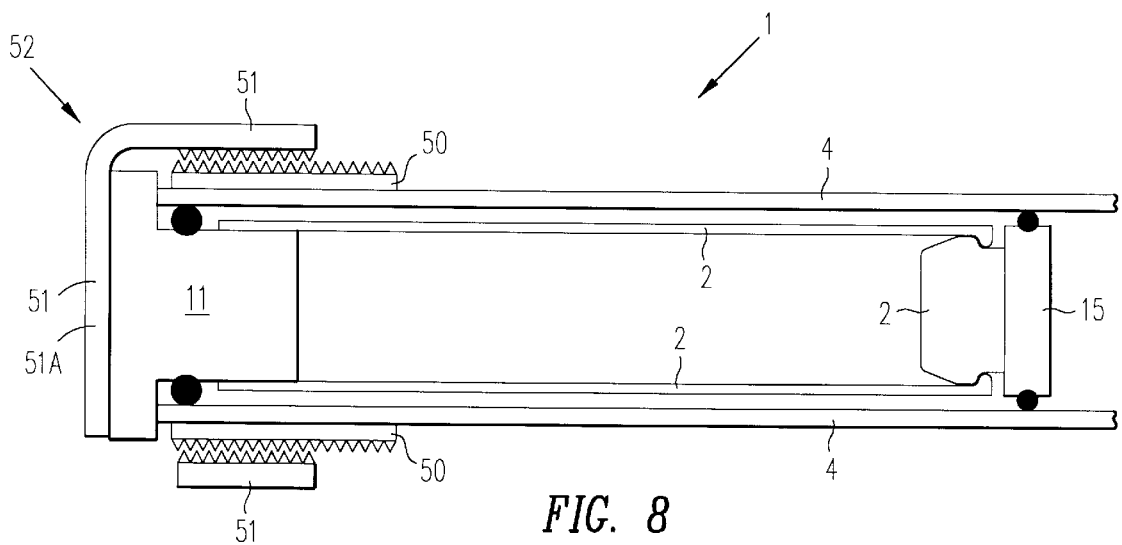
FIG. 8 is a cross-sectional diagram in accordance with a fifth embodiment.
Figure 9:
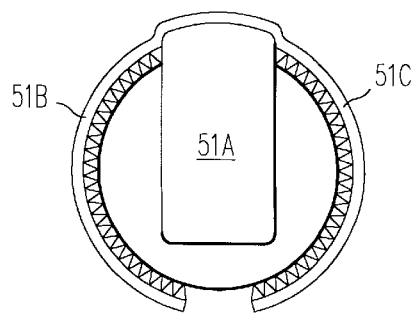
FIG. 9 is an end view of the embodiment of FIG. 8.

FIG. 8 is a cross-sectional diagram of a fifth embodiment wherein the cylindrical storage member 2 is secured inside the handlebar 4 using strips of a hook and loop fastener (Velcro). A first strip 50 of Velcro is wrapped around and attached to the outer surface of the handlebar 4 as illustrated in FIG. 8. A second strip 51 of Velcro is attached to the outer end of the bar end cap 11. In one embodiment, second strip 51 is T-shaped. One leg 51A of the T-shaped strip is fixed to the outer end of the bar end cap 11. This leg 51A is long enough to extend over (see location 52) and around the circumferential rim of the bar end cap 11 as illustrated. The two extending legs 51B and 51C of the T-shaped strip extend around the outer surface of the handlebar as illustrated in the end view of FIG. 9 and couple to the first strip of Velcro 50. The storage apparatus 1 therefore removably engages the handlebar via the first strip of Velcro 50. The second Velcro strip 51 can be glued to the bar end cap 11 and the first Velcro strip 50 can be glued to the handlebar. To remove the storage member 2 from the handlebar, the second Velcro strip 51 is decoupled from the first Velcro strip 50 and the storage member 2 is slid out of the handlebar. In this embodiment, end cap 15 is removed to gain access to items stored in the storage member 2.

Figure 10:
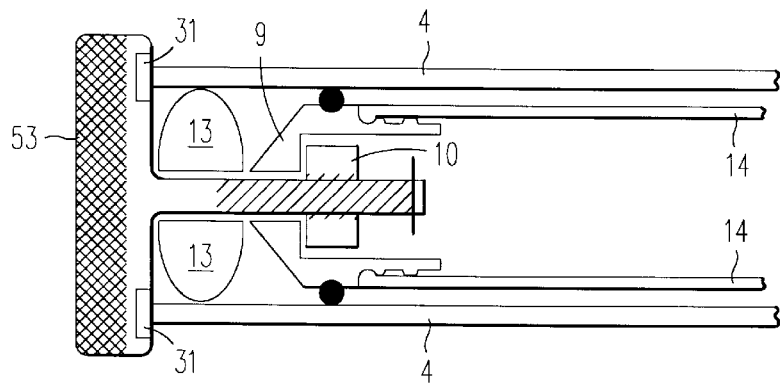
FIG. 10 is a cross-sectional diagram in accordance with a sixth embodiment.

FIG. 10 is a cross-sectional diagram of a sixth embodiment wherein a bar end bolt 53 is used. This embodiment has a small number of parts and has a relatively feature-free outer form that does not interfere with hand or bicycle grip placement on the handlebar, does not have extending features to break off in the event of a crash, and does not tend to predispose the rider to injury due to unintentional contact. The diameter and thickness of the textured head of bar end bolt 53 functions to facilitate manual grasping.

It is to be understood that various aspects of the illustrated embodiments can be combined in other combinations. Other types of devices can be employed to removably engage a handlebar. The embodiments are not limited to particular materials. Bar end cap 11 can have a flat planar outer surface as illustrated, or any other suitable shape including a concave shape, a convex shape, and a conical shape. Bar end cap 11 with finger grip portion 12, finger grip portion 7, pull rod 20, and/or lever 21, can be made of metal or plastic or any other suitable material including ceramic, fiberglass, wood, nylon, rubber and carbon-graphite. Any suitable means for engaging the handlebar can be used including a press-in friction plug, a function-duz fastener or a wedge-plate.

Figure 11:
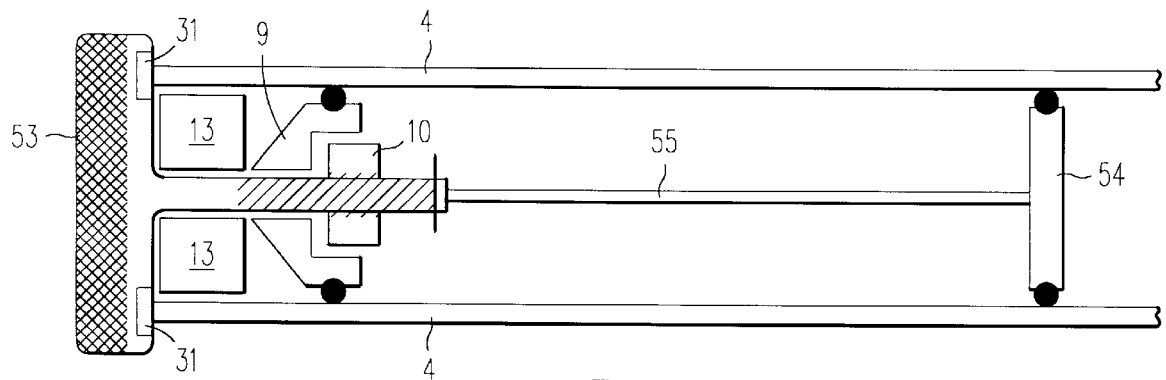
FIG. 11 is a cross-sectional diagram in accordance with a seventh embodiment.

FIG. 11 illustrates a rod-to-plate embodiment (seventh embodiment) wherein no cylindrical storage member is provided. Rather, an end plate 54 is connected to bar end bolt 53 via a connecting rod 55. This end plate 54 retains the item to be stored along with the inside of the handlebar itself.

Figure 12:
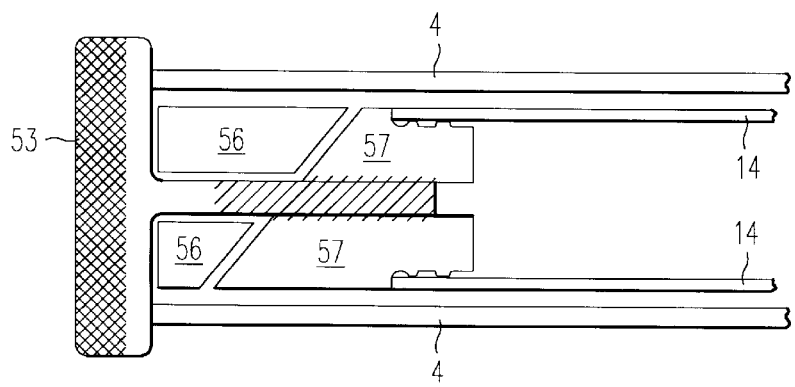
FIG. 12 is a cross-sectional diagram in accordance with an eighth embodiment.
Figure 13:
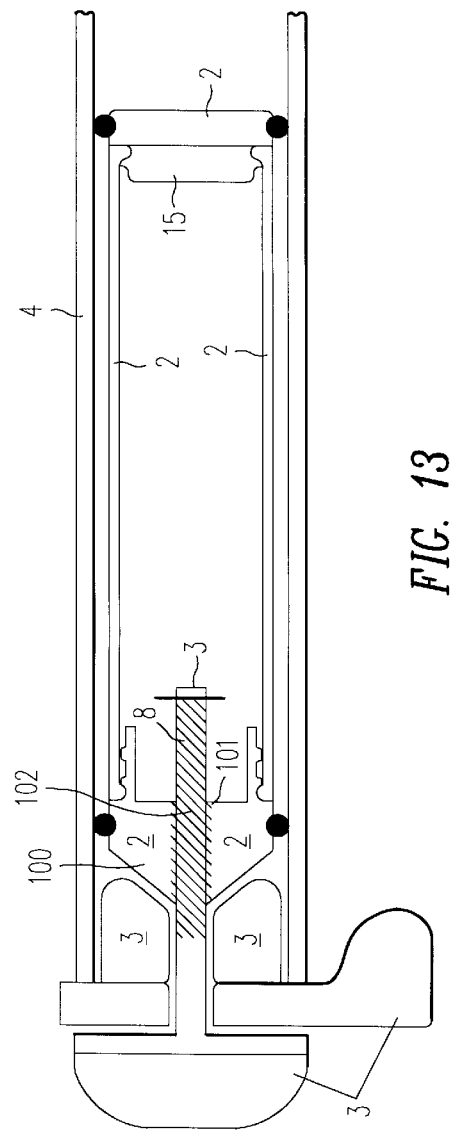
FIG. 13 is a cross-sectional diagram of an embodiment wherein substantially cylindrical storage member 2 has a conical end 100, and wherein shaft 8 of end cap 3 extends through a threaded axial opening in conical end 100 such that threads 102 on shaft 8 engage threads 101 on the inside surface of the axial opening.
Figure 14:
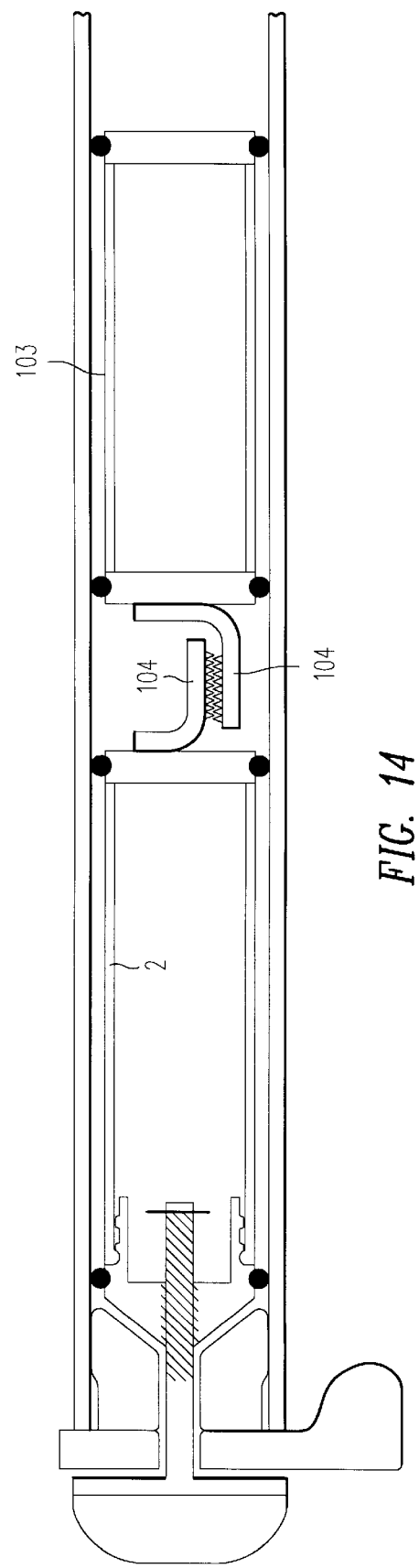
FIG. 14 is a cross-sectional diagram of an embodiment wherein a first substantially cylindrical storage member 2 is coupled end-to-end with a second substantially cylindrical storage member 103 via a hook and loop fastener (Velcro) 104.

FIG. 12 illustrates an eighth embodiment utilizing two wedge-plates 56 and 57 which slidingly engage each other. This is the same mechanism commonly used in bicycle stems.

The expanding washer of the embodiments described above can have any suitable shape including a cone-shape, a ball-shape, a cylinder-shape, a ring-shape, and a ribbed-shape. Any suitable material can be used including rubber and microcellular urethane. The expandable washer can be compressed between any two suitable surfaces including planar, spherical and/or conical surfaces. The storage member 2 can involve a tubular member made of plastic, metal, ceramic, fiberglass, nylon, rubber, wood or carbon-graphite. Rather than a tubular member, a soft bag can be used as the storage member 2. In some embodiments, the storage apparatus does not involve a container. Rather, the item to be stored is removably fixed to the storage apparatus inside the handlebar without being disposed in a container. Multiple containers can be used with the same means for engaging, the containers being coupled together end-to-end inside the handlebar (for example with a hook and loop fastener). The method of coupling the storage member to the means for engaging is not limited to threaded connections and snap fittings but rather extends to other suitable types of couplings.

Although the present invention is described in connection with certain specific embodiments for instructional purposes, the present invention is not limited thereto. A tire patch kit, tire levers, a carbon dioxide cartridge with a valve adapter, a first aid kit, a fire starter kit and/or a map can be stored in a bicycle handlebar using the storage apparatus. Personal items, tools, an electronic locator, communications devices, food, batteries, energy sources or parts thereof can be stored. The storage apparatus is usable to store items in other tubular members including other tubular members of a bicycle, ski poles, walking staffs, snowmobiles and all terrain vehicles. A storage apparatus may be placed in a bicycle seatpost. Accordingly, various modifications, adaptations, and combinations of various features of the described embodiments can be practiced without departing from the scope of the invention as set forth in the claims.

What is claimed is:

1. A storage apparatus for a cycle, comprising:
   a substantially cylindrical storage member having an outside diameter smaller than an inside diameter of a handle portion of a handlebar of said cycle; and
   means for removably engaging said handle portion of said handlebar, said means being coupled to said substantially cylindrical storage member such that said means secures said substantially cylindrical storage member within said handle portion of said handlebar when said means engages said handle portion of said handlebar, said means and said substantially cylindrical storage member being removable from said handle portion of said handlebar when said means is not engaging said handle portion of said handlebar, wherein said means comprises a first portion and a second portion, the second portion removably engaging an inside surface of said handlebar when said substantially cylindrical storage member is secured within said handlebar, said first portion having a finger grip portion, said finger grip portion being accessible from outside said handlebar when said substantially cylindrical storage member is secured within said handlebar by said means, wherein said first portion of said means is rotatable with respect to said second portion of said means, said second portion having an expandable portion which expands circumferentially when said first portion is rotated in a first direction with respect to said second portion, said expandable portion contracting circumferentially when said first portion is rotated in a second direction opposite said first direction.

2. The storage apparatus of claim 1, wherein said expandable portion of said means is an expandable washer.

3. The storage apparatus of claim 1, wherein said handlebar has an outside diameter, said finger grip portion of said means extending beyond said outside diameter when said substantially cylindrical storage member is secured within said handlebar by said means.

4. The storage apparatus of claim 1, said finger grip portion having a vane portion with two opposing substantially planar gripping surfaces, each of said substantially planar surface having a surface area of at least 0.5 square inches.

5. The storage apparatus of claim 3, wherein said substantially cylindrical storage member comprises a tubular member and an end cap, said end cap removably engaging an open end of said tubular member.

6. The storage apparatus of claim 1, wherein said substantially cylindrical storage member has a permanently closed end.

7. The storage apparatus of claim 1, wherein said cycle is a bicycle.

8. The storage apparatus of claim 1, wherein said cycle is a motorcycle.

9. The storage apparatus of claim 1, further comprising:
   means for reducing rattling of said substantially cylindrical storage member against an inside surface of said handlebar.

10. The storage apparatus of claim 9, wherein said substantially cylindrical storage member has an annular recess retaining said means for reducing rattling, said means for reducing rattling being an O-ring.

11. The storage apparatus of claim 1, further comprising:
    a second substantially cylindrical storage member coupled end-to-end with the substantially cylindrical storage member.

12. The storage apparatus of claim 11, wherein the second substantially cylindrical storage member is coupled end-to-end with the substantially cylindrical storage member with a hook and loop fastener.

13. A storage apparatus for a cycle, comprising:
   a substantially cylindrical storage member having an outside diameter smaller than an inside diameter of a handle portion of a handlebar of said cycle; and
   means for removably engaging said handle portion of said handlebar, said means being coupled to said substantially cylindrical storage member such that said means secures said substantially cylindrical storage member within said handle portion of said handlebar when said means engages said handle portion of said handlebar, said means and said substantially cylindrical storage member being removable from said handle portion of said handlebar when said means is not engaging said handle portion of said handlebar,
wherein said means comprises an expandable washer.

14. The storage apparatus of claim 13, wherein said means further comprises: a nut having threads, a wedge cap engaging said substantially cylindrical storage member, an end cap member, and a rotatable member having a threaded shaft, said shaft extending through said end cap, through said expandable washer, and through said wedge cap so that said threaded shaft engages said threads of said nut.

15. The storage apparatus of claim 14, wherein said rotatable member has an end with an opening adapted for engaging one of an end of a screwdriver and an Allen wrench.

16. The storage apparatus of claim 13, wherein said substantially cylindrical storage member has a conical end which engages said expandable washer, and wherein said means for removably engaging further comprises a means for engaging the conical end to the expandable washer in order to make the expandable washer expand.

17. The storage apparatus of claim 13, wherein said substantially cylindrical storage member has a conical end which engages said expandable washer, said conical end of said substantially cylindrical storage member having a threaded axial opening, said means further comprising an end cap having a shaft, said shaft having threads, said threads on said shaft engaging threads of said threaded axial opening of said substantially cylindrical storage member.

18. The storage apparatus of claim 5, wherein said means comprises a first portion and a second portion, the second portion removably engaging an inside surface of said handlebar when said substantially cylindrical storage member is secured within said handlebar, said first portion having a finger grip portion, said finger grip portion being accessible from outside said handlebar when said substantially cylindrical storage member is secured within said handlebar by said means.

19. A storage apparatus for a cycle, comprising:
   a substantially cylindrical storage member having an outside diameter smaller than an inside diameter of a handle portion of a handlebar of said cycle; and
   means for removably engaging said handle portion of said handlebar, said means being coupled to said substantially cylindrical storage member such that said means secures said substantially cylindrical storage member within said handle portion of said handlebar when said means engages said handle portion of said handlebar, said means and said substantially cylindrical storage member being removable from said handle portion of said handlebar when said means is not engaging said handle portion of said handlebar,
wherein said means comprises a strip of a hook and loop fastener, said means removably engaging said handlebar via another strip of said hook and loop fastener fixed to said handlebar.

20. A storage apparatus, comprising:
   means for removably engaging a handle portion of a handlebar; and
   a storage member disposed inside said handle portion of said handlebar and retaining an item to be stored inside said handle portion of said handlebar, said storage member being coupled to said means for removably engaging and having a length of greater than three inches,
wherein said means removably engages said handlebar by removably engaging a piece of a hook and loop fastener attached to said handlebar.

21. The storage apparatus of claim 20, wherein said item is one of a tire lever and a tire patch.

* * * * *